(12) United States Patent
Ramanathan et al.

(10) Patent No.: US 8,644,461 B2
(45) Date of Patent: *Feb. 4, 2014

(54) UNIFIED RULES FOR VOICE AND MESSAGING

(75) Inventors: Rajesh Ramanathan, Redmond, WA (US); Eran Shtiegman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/292,780

(22) Filed: Nov. 9, 2011

(65) Prior Publication Data
US 2012/0059892 A1  Mar. 8, 2012

Related U.S. Application Data

(63) Continuation of application No. 11/768,439, filed on Jun. 26, 2007, now Pat. No. 8,068,588.

(51) Int. Cl.
*H04M 1/64* (2006.01)
*H04L 12/28* (2006.01)
*G06F 15/16* (2006.01)
*G06Q 30/00* (2012.01)

(52) U.S. Cl.
USPC ........ 379/88.13; 370/230; 370/356; 370/389; 370/392; 370/503; 379/32.04; 379/242; 399/82; 455/436; 455/456.1; 455/558; 700/103; 703/1; 709/204; 709/206; 709/207; 709/228; 709/238; 711/141; 711/146; 717/117; 726/1; 726/22

(58) Field of Classification Search
USPC ................ 370/235, 389, 392, 503, 230, 356; 379/88.13, 88.17, 32.04, 242; 399/82; 700/103; 703/1; 705/7.25, 26.35, 26.8, 705/26.81, 26.82, 2; 709/204, 206, 205, 709/207, 228, 238; 711/141, 146; 717/117; 726/1, 22; 707/694; 719/318; 455/436, 455/456.1, 558
See application file for complete search history.

(56) References Cited

U.S. PATENT DOCUMENTS

| | | | | |
|---|---|---|---|---|
| 6,148,164 A * | 11/2000 | Shima | .............................. | 399/82 |
| 6,301,609 B1 * | 10/2001 | Aravamudan et al. | ........ | 709/207 |
| 6,690,788 B1 * | 2/2004 | Bauer et al. | .................... | 379/242 |
| 6,757,689 B2 * | 6/2004 | Battas et al. | ........................... | 1/1 |
| 6,782,400 B2 * | 8/2004 | Geuss et al. | ................... | 707/694 |
| 6,954,757 B2 * | 10/2005 | Zargham et al. | ....................... | 1/1 |
| 7,069,194 B2 * | 6/2006 | Karlsberg | .......................... | 703/1 |
| 7,505,463 B2 * | 3/2009 | Schuba et al. | ................ | 370/392 |
| 7,539,823 B2 * | 5/2009 | Kakeda | .......................... | 711/141 |
| 7,552,179 B2 * | 6/2009 | Jain et al. | ....................... | 709/206 |
| 7,568,008 B2 * | 7/2009 | Jain et al. | ....................... | 709/206 |
| 7,627,891 B2 * | 12/2009 | Williams et al. | ................... | 726/1 |
| 7,631,296 B2 * | 12/2009 | Seshadri et al. | ............... | 717/117 |
| 7,660,742 B2 * | 2/2010 | Biwer et al. | ................ | 705/26.82 |
| 7,742,948 B2 * | 6/2010 | Welter et al. | ................ | 705/26.35 |

(Continued)

*Primary Examiner* — Gerald Gauthier

(57) ABSTRACT

The claimed subject matter provides a system and/or a method that facilitates managing an incoming data communication in connection with unified communications. A unified communications component can employ unified communications for a data communication with at least the following data communication modes: an email data communication mode, a voice data communication mode, and a voicemail data communication mode. A unified rules component can automatically redirect the data communication to a delegate for receipt based upon a universal rule, the universal rule is uniformly applicable to at least two of the email data communication mode, the voice data communication mode, or the voicemail data communication mode.

19 Claims, 10 Drawing Sheets

(56) References Cited

U.S. PATENT DOCUMENTS

| | | | |
|---|---|---|---|
| 7,760,730 B2* | 7/2010 | Goldschmidt et al. | 370/392 |
| 7,813,949 B2* | 10/2010 | Grendel et al. | 705/7.25 |
| 7,903,549 B2* | 3/2011 | Judge et al. | 370/230 |
| 7,962,377 B2* | 6/2011 | Grendel et al. | 705/26.81 |
| 8,027,886 B2* | 9/2011 | Welter et al. | 705/26.8 |
| 8,068,588 B2* | 11/2011 | Ramanathan et al. | 379/88.13 |
| 8,104,045 B1* | 1/2012 | Yanosy, Jr. | 719/318 |
| 8,230,024 B2* | 7/2012 | Ramanathan et al. | 709/206 |
| 8,364,761 B2* | 1/2013 | Ramanathan et al. | 709/205 |
| 2002/0107864 A1* | 8/2002 | Battas et al. | 707/101 |
| 2003/0083767 A1* | 5/2003 | Karlsberg | 700/103 |
| 2004/0111476 A1* | 6/2004 | Trossen et al. | 709/206 |
| 2005/0135429 A1* | 6/2005 | Bingham et al. | 370/503 |
| 2005/0246686 A1* | 11/2005 | Seshadri et al. | 717/117 |
| 2005/0276262 A1* | 12/2005 | Schuba et al. | 370/389 |
| 2006/0013136 A1* | 1/2006 | Goldschmidt et al. | 370/235 |
| 2006/0075051 A1* | 4/2006 | Jain et al. | 709/206 |
| 2006/0112430 A1* | 5/2006 | Deisenroth et al. | 726/22 |
| 2007/0195779 A1* | 8/2007 | Judge et al. | 370/392 |
| 2008/0172717 A1* | 7/2008 | Malcolm | 726/1 |
| 2009/0003542 A1* | 1/2009 | Ramanathan et al. | 379/88.13 |
| 2009/0006548 A1* | 1/2009 | Ramanathan et al. | 709/204 |
| 2009/0006632 A1* | 1/2009 | Ramanathan et al. | 709/228 |
| 2009/0034696 A1* | 2/2009 | Ramanathan | 379/88.17 |
| 2009/0254988 A1* | 10/2009 | Nonaka et al. | 726/22 |
| 2012/0059892 A1* | 3/2012 | Ramanathan et al. | 709/206 |

* cited by examiner

DELEGATE PERMISSIONS: USER A

This delegate has the following permissions

- Calendar: Editor (can read, create, and modify items)
  - ☑ Delegate receives copies of meeting-related messages sent to me
- Calls: Receive and make calls on my behalf
  - Advanced...
- Tasks: Editor (can read, create, and modify items)
- Inbox: None
- Contacts: None
- Notes: None
- Journal: None ☐ Automatically send a message to delegate summarizing these permissions ☐ Delegate can see my private items

[ OK ] [ Cancel ]

FIG. 5

UNIFIED RULES FOR VOICE AND MESSAGING

CROSS-REFERENCE TO RELATED APPLICATIONS

This application is a continuation of U.S. patent application Ser. No. 11/768,439, filed Jun. 26, 2007, entitled UNIFIED RULES FOR VOICE AND MESSAGING, which is hereby incorporated by reference in its entirety.

BACKGROUND

Computing and network technologies have transformed many aspects of everyday life. Computers have become household staples rather than luxuries, educational tools and/or entertainment centers, and provide individuals and corporations with tools to manage and forecast finances, control operations such as heating, cooling, lighting and security, and store records and images in a permanent and reliable medium. Networking technologies like the Internet provide individuals virtually unlimited access to remote systems, information and associated applications.

As computing and network technologies have evolved and have become more robust, secure and reliable, more consumers, wholesalers, retailers, entrepreneurs, educational institutions and the like are shifting paradigms and are employing the Internet to perform business rather traditional means. For example, today consumers can access their bank accounts on-line (e.g., via the Internet) and can perform an ever growing number of banking transactions such as balance inquiries, fund transfers, bill payments, and the like. In light of such technological advances and evolution, people in general tend to be more and more concerned about being connected and/or available for various communications such as cell phone calls, text messages, emails, instant messages, land line phone calls, voice mails, real-time communications, etc. With the rapid pace of today's society, being available and/or reachable on a constant basis is fitting for busy lifestyles albeit personal or business.

However, under circumstances when an individual is knowingly unavailable, incoming data communications can be forwarded and/or redirected. For instance, a business person who plans on being out of town can designate his/her assistant to handle incoming data communications such as a voice call or an email using separate and distinct rules or applications. Thus, an incoming voice call to the business person can be automatically directed to the assistant to allow such voice call to be handled rather than being transferred to a voice mail system considering human interaction is more pleasing than automated services. Forwarding, redirection, and/or delegation generally can be applied to voice and email data communications, but tremendous difficulty exists in utilizing such techniques in the realm of unified communications across various data communication modes. To this end, the delegation of various data communications associated with unified communications typically involve complicated server and application interaction that can be tedious and expensive to implement.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate redirecting data communications with unified rules within unified communications. A unified rules component can uniformly enforce a universal rule to a plurality of data communication modes in unified communications. In general, the unified rules component can utilize the universal rule to delegate, forward, and/or redirect a data communication independent of a data communication mode/format. In other words, the universal rule can be uniformly applied across numerous disparate data communication modes within unified communications such as, for instance, email, voice, voicemail, audio, instant messaging, video, etc. By utilizing the unified rules component to create a universal rule, delegating data communications within unified communications is greatly enhanced since the universal rule can be universally applied rather than creating distinct and separate rules for each data communication mode.

In accordance with one aspect of the claimed subject matter, a block component can enable the blocking and/or unblocking of a data communication in a global and/or universal manner. In general, the block component can identify a data communication in a data communication mode as junk/unwanted, wherein such identification can be translated across additional data communication modes within unified communications (e.g., not allowing the sender to communicate in any format/mode). Moreover, the block component can identify a data communication as not junk and/or wanted, wherein such identification can be translated across additional data communication modes within unified communications (e.g., allowing the sender to communicate in any format/mode). In other aspects of the claimed subject matter, methods are provided that facilitate assigning a delegate to handle data communications with universal rules applicable to a plurality of data communication modes within unified communications.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 5 illustrates a block diagram of exemplary user interface that facilitates employing a universal rule for the delegation of data communications within unified communications.

DETAILED DESCRIPTION

Figure 1:
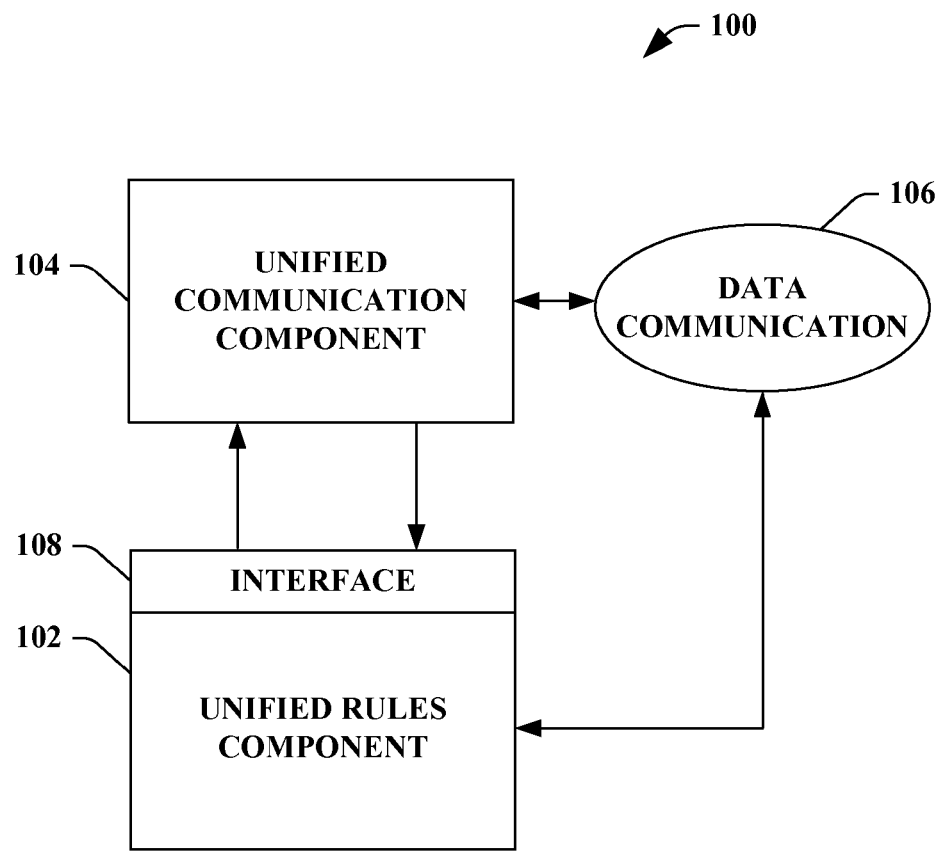
FIG. 1 illustrates a block diagram of an exemplary system that facilitates redirecting data communications with unified rules within unified communications.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "application," "server," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates redirecting data communications with unified rules within unified communications. The system 100 can include a unified rules component 102 that can implement a universal rule to delegate and/or redirection a data communication 106 employed by a unified communication component 104. In particular, the data communication 106 can be any suitable data communication related to unified communications utilizing any suitable data communication mode, such as but not limited to, an email data communication mode, a voice data communication mode, an audio data communication mode, an instant messaging data communication mode, a video data communication mode, and/or a voicemail data communication mode. The unified rules component 102 can allow the universal rule to redirect, forward, and/or delegate the data communication 106 independent of the data communication mode. Specifically, the unified rules component 102 can enforce a universal rule that can be applied to at least two or more of the email data communication mode, the voice data communication mode, the audio data communication mode, the instant messaging data communication mode, the video data communication mode or the voicemail data communication mode. In other words, the universal rule can be uniformly and seamlessly utilized for delegation, forwarding, and/or redirection of the data communication 106 regardless of the data communication mode/format.

It is to be appreciated that the unified communications component 104 can be an integrated enterprise communication client which can enable real-time communications (e.g., communication session 106) utilizing various data communication modes such as, but not limited to, instant messaging, voice over Internet protocol (VoIP) communication, video conferencing, audio, voice, desktop sharing, application sharing, etc. The unified communications component 104 can leverage a server (not shown) in order to initiate communication sessions 106 utilizing at least one data communication mode. Furthermore, the unified communications component 104 can further enable integration of various computer applications and/or software within the communication session 106 such as, but not limited to, a word processing application, a data spreadsheet application, a presentation/slide creation program, an email application (e.g., leveraging off of address books, contact information, etc.), note taking applications, information gathering applications, multi-user collaboration note taking applications, desktop sharing applications, shared workspace applications, proprietary peer-to-peer software applications, and/or enterprise portal applications. In other words, the unified communications component 104 can employ real-time communications via communication sessions 106 in various data communication modes in which numerous applications and/or software can be leveraged in order to enhance the real-time communication experience.

The unified rules component 102 can utilize the universal rule for voice, email, and/or voicemail. For example, the unified rules component 102 can allow a user to create a universal rule for delegation, redirection, and/or forwarding of an incoming data communication (e.g., data communication 106). Rather than setting up individual rules and respective settings for each data communication mode with unified communications, the system 100 enables a single universal rule to be applied to voice, email, and/or voicemail data communication modes. For example, the universal rule can be created in which any incoming data communication targeted for user A can be delegated, redirected, and/or forwarded to assistant A. The universal rule can then enable all incoming emails, voice calls, and/or voicemails targeted to user A to be redirected and/or delegated to assistant A. Thus, user A can create the universal rule and respective settings (discussed in more detail below) in order to facilitate delegation of incoming data communications. It is to be appreciated that the ability to set up the universal rules for voice, fax, email, and/or voicemail together can be from a single component (e.g., the unified rules component 102 which can be hardware, software, and/or any combination thereof). It is to be further appreciated that unified rules component 102 provides a notion of "universal rules," but integrates into separate email and voice systems to provide the appearance of a "universal rule" behavior for the user.

In addition, the system 100 can include any suitable and/or necessary interface component 108 (herein referred to as "interface 108"), which provides various adapters, connectors, channels, communication paths, etc. to integrate the unified rules component 102 into virtually any operating and/or database system(s) and/or with one another. In addition, the interface component 108 can provide various adapters, connectors, channels, communication paths, etc., that provide for interaction with the unified rules component 102, unified communication component 104, the data communication 106, and any other device and/or component associated with the system 100.

Figure 2:
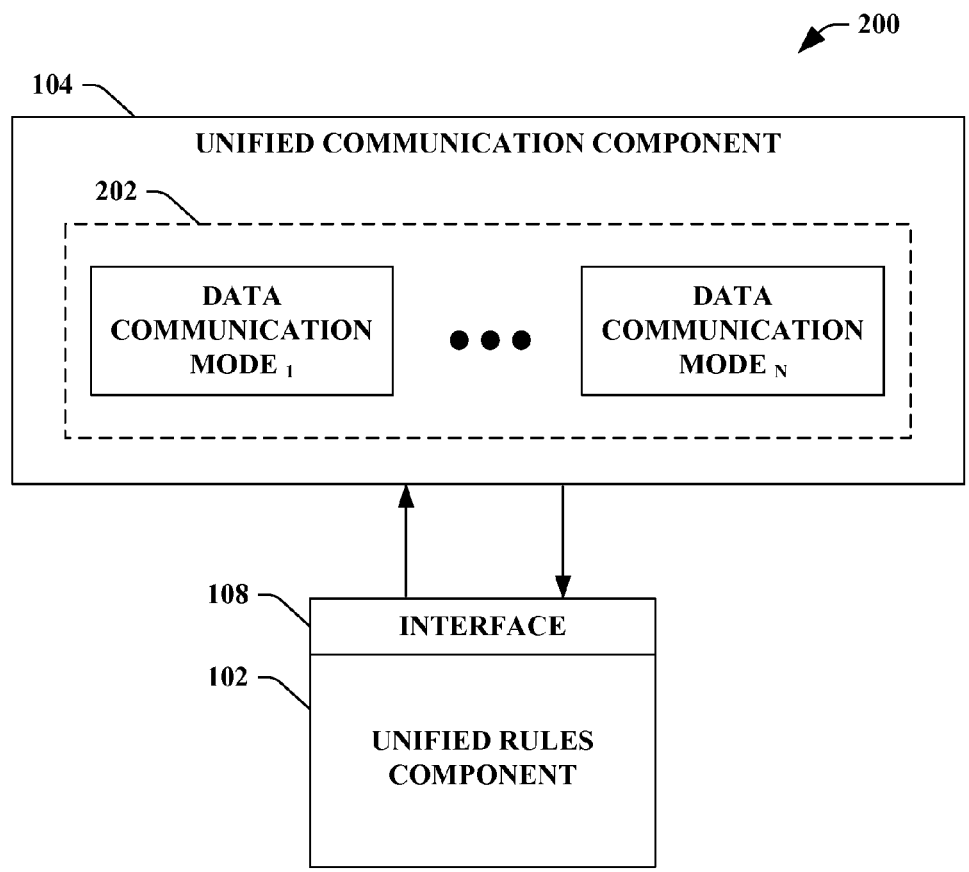
FIG. 2 illustrates a block diagram of an exemplary system that facilitates assigning a delegate to handle data communications with universal rules applicable to a plurality of data communication modes within unified communications.

FIG. 2 illustrates a system 200 that facilitates assigning a delegate to handle data communications with universal rules applicable to a plurality of data communication modes within unified communications. The system 200 can include the unified rules component 102 that can employ a universal rule that automatically redirects a data communication to a delegate independent of the data communication format, mode, etc. In other words, a user can delegate a disparate user/machine to handle and/or receive data communications utilizing a single universal rule for a plurality of data communication modes 202.

It is to be appreciated that the universal rule utilized by the unified rules component 102 can be applicable to any suitable data communication associated with unified communications. For instance, the unified communications component 104 can employ data communications in connection with unified communications, wherein the universal rule can redirect, forward, delegate data communications (e.g., incoming data communications) regardless of the data communication mode 202. It is to be appreciated that there can be any suitable number of data communication modes 202 such as, but not limited to, data communication mode$_1$ to data communication mode$_N$, where N is a positive integer. For example, the data communication mode can be any communication mode or format that can be utilized with unified communications (e.g., email, fax, voice, instant messaging, voicemail, audio, video, etc.).

For instance, the system 200 can enable seamless and universal delegation of data communications and respective data communication modes/formats associated with unified communications. The unified rules component 102 can set a universal rule that can be applicable to voice, fax, email, and voicemail. Furthermore, the unified rules component 102 can provide automatic interaction between a voice rule and an email rule to enhance delegation scenarios. For example, a boss can set an admin as a delegate for voice, wherein the admin can get automatically set as a delegate for email so that he or she can read the voice messages for the boss since such voice messages can be delivered as email. In another example, a user can set a disparate user as a delegate for email and the email application can allow the user to set the disparate user as a delegate for voice as well (e.g., enabling the option of assigning the delegate for one or more of the data communication modes).

Furthermore, the unified rules component 102 can enable the ability to set an email rule and enforce such email rule to voice (e.g., utilizing the universal rule across a plurality of data communication modes). For example, a user can set a rule in a calendar to set an "Out of Office" auto reply for email, wherein the voicemail greeting can be automatically updated or changed to indicate that the user is out of the office. Moreover, the unified rules component 102 can enable seamless enforcement of the universal rule across the data communication modes within unified communications. In other words, a user can implement a universal rule for a first data communication mode and it can be automatically populated and/or enforced in a second data communication mode. For instance, a user can change a presence status in a unified communications applications/software to "Do not disturb," which can be utilized to automatically implement an auto-reply for email with the message "User is busy at this moment." It is to be appreciated that this can help in external user scenarios where the email sender has access to email but does not have access to an application that could have viewed the out of office presence state.

Figure 3:
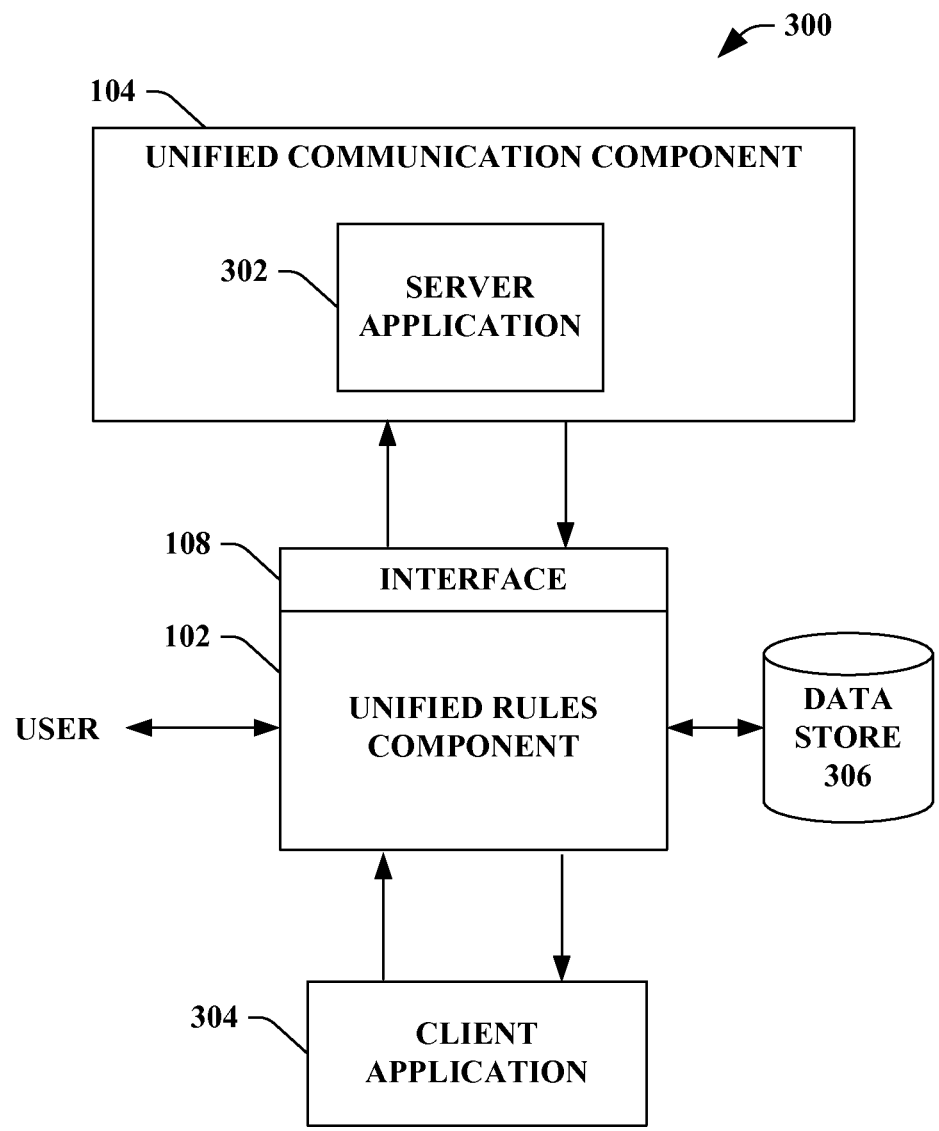
FIG. 3 illustrates a block diagram of an exemplary system that facilitates managing delegates within unified communications utilizing unified rules for email, voice, and/or voicemail.

FIG. 3 illustrates a system 300 that facilitates managing delegates within unified communications utilizing unified rules for email, fax, voice, and/or voicemail. The system 300 can include the unified rules component 102 that enables a rule (e.g., a universal rule) to be universally employed within unified communications to a data communication regardless of the data communication mode (e.g., voice, email, voicemail, audio, fax, video, instant messaging, etc.). The unified rules component 102 can enable seamless delegation of data communications between a server application 302 and a client application 304 in connection with unified communications. For example, the server application 302 can be an email server, a server related to an integrated enterprise communication client (e.g., the unified communication component 104), and/or any server utilized in connection with a data communication and/or a data communication mode (e.g., instant messaging, voice, audio, video, email, fax, voicemail, etc.). In another example, the client application can be an email application, an integrated enterprise communication client, an instant messaging client application, a voice client application (e.g., Voice over Internet protocol), an audio client application, and/or any client application utilized in connection with a data communication and/or a data communication mode (e.g., instant messaging, voice, audio, video, email, fax, voicemail, etc.).

The system 300 can further include a data store 306 that can include any suitable data related to the unified rules component 102, the unified communications component 104, a data communication, a data communication mode, and/or any suitable data associated with the system 300. For example, the data store 306 can include, but not limited to including, universal rules, universal rule settings (discussed in detail below), data communication modes, user data, user universal rule preference, delegate data, delegate assignment, historic data related to delegation, log data related to universal rule, redirection data, forwarding data, delegation data, etc.

It is to be appreciated that the data store 306 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 306 of the subject systems and methods is intended to comprise, without being limited to, these and any other suitable types of memory. In addition, it is to be appreciated that the data store 306 can be a server, a database, a hard drive, a pen drive, an external hard drive, a portable hard drive, and the like.

Figure 4:
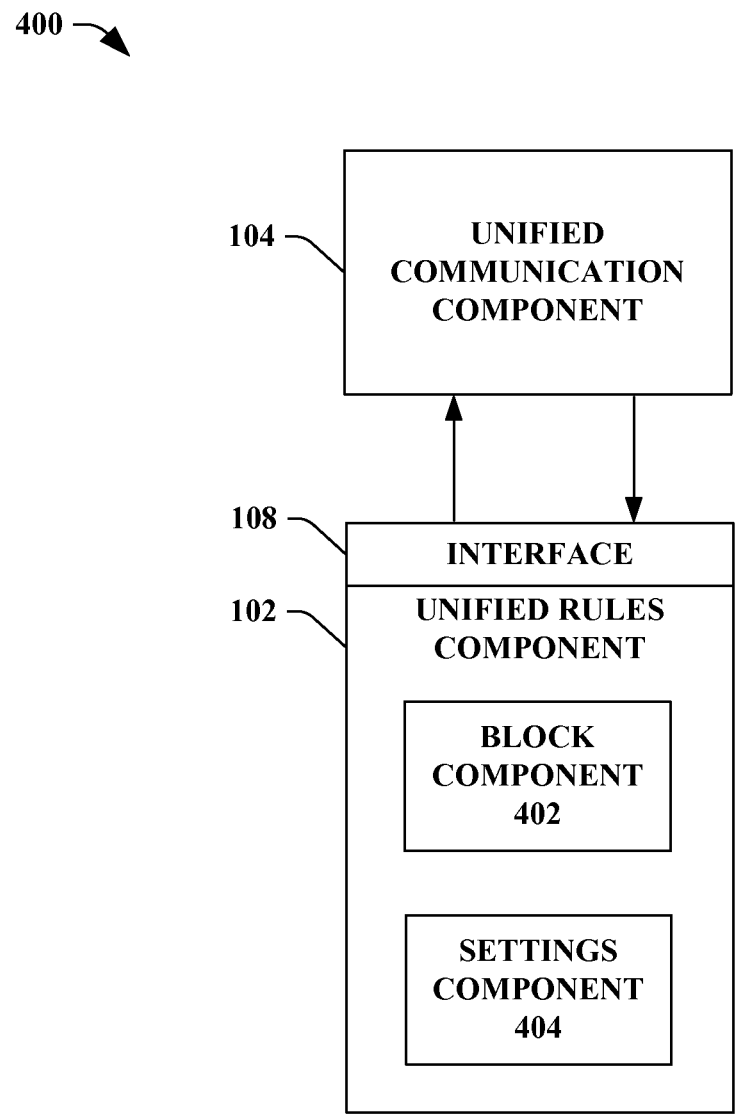
FIG. 4 illustrates a block diagram of an exemplary system that facilitates managing a universal rule for unified communications for enhanced data communication.

FIG. 4 illustrates a system 400 that facilitates managing a universal rule for unified communications for enhanced data communication. The system 400 can include the unified rules component 102 that enables a universal rule to redirect, forward, and/or delegate a data communication across a plurality of data communication modes/formats within unified communications. For instance, the unified communication component 104 can employ a data communication in a plurality of data communication modes in which the unified rules component 104 can allow a rule to be uniformly utilized across the data communication modes (e.g., voice, audio, voicemail, fax, email, instant messaging, video, etc.). For example, a user can create a universal rule to redirect email communications to be forwarded to an assistant, wherein such universal rule can be automatically applied to voice and/or voicemail (e.g., voice and/or voicemail communications are forwarded to the assistant as well).

The unified rules component 402 can utilize a block component 402 that can provide uniform blocking of data communications within unified communications. The block component 402 can receive data identifying a data communication should be blocked (e.g., user identified, filter identified, server identified, etc.), wherein such data communication can be blocked across the data communication modes within unified communications. Thus, a universal rule associated with blocking (e.g., identifying as spam) can be utilized universally across the various data communication modes such as, but not limited to, email, fax, voice, audio, voicemail, video, etc. For instance, user A can select to block an email from user B by placing/marking such emails as junk/spam. Upon such identification, a future voice mail from user B (as well as future emails) can be automatically marked as junk. It is to be appreciated that data communications identified as junk/spam can be utilized across any data communication mode. Thus, a voice communication identified as junk/spam can be utilized to mark/identify future emails as junk/spam. In another example, a user can set a junk email in an email application, in which an option can be provided whether to block incoming voice calls from such identified sender of junk. It is to be further appreciated that when a user marks an email as "not junk" or "not spam," the appropriate caller/sender can be removed from a blocked caller list.

The system 400 can further utilize a settings component 404 to facilitate generating a universal rule to redirect, forward, and/or delegate data communications. The settings component 404 can allow the set-up and/or creation of rules and respective settings, wherein such settings can be specifically tailored to particular users. For instance, a user can utilize the unified rules component 102 to create a universal rule for delegation of a data communication within unified communications, where the settings component 404 can enable the set-up and/or collect details for such universal rule. It is to be appreciated that the settings can be initially default settings, wherein a user can change and/or update such settings in order to specifically tailor the universal rule to his or her liking.

It is to be appreciated that such settings are examples, and a plurality of nuances, subtleties, and/or variances can exist which are intended to be within the scope of the claimed subject matter but not limiting thereupon. For example, the settings component 404 can allow settings to be user-defined, wherein such settings can relate to, but not limited to, data communication mode applicability (e.g., which data communication modes to apply the universal rule), delegate assignment (e.g., user/machine to redirect/transfer/forward data communications), delayed transfer/redirection/forwarding (e.g., immediate redirection of data communication, delay of redirection, etc.), logging/tracking settings (e.g., track on all delegations, track on data communication mode(s), etc.), spam/junk applicability for data communication modes (e.g., block any data communication across all modes or formats, block email and voice, etc.), receipt settings (e.g., receipt of redirection to delegate), monitoring of delegated communications (e.g., allow monitoring of data communications received/handled by the delegate), privacy settings, security settings, permissions (e.g., read, create, edit, modify, etc.) related to editor/owner, permissions related to delegate (e.g., person/machine assigned to receive data communications), etc.

FIG. 5 illustrates a user interface 500 that facilities employing a universal rule for the delegation of data communications within unified communications. It is to be appreciated that the user interface 500 depicted is an example and the subject innovation is not to be so limited. In addition, it is to be appreciated that there are a plurality of nuances and/or subtleties that can be employed in connection with the user interface 500, thus any such changes are to be considered within the scope of the claimed subject matter. The user interface 500 can provide delegation permissions associated with data communications and/or data communication modes/formats for a particular user. For illustration and the sake of brevity, the user interface 500 relates to the delegate permissions for user A. It is to be appreciated that the user interface 500 can enable a universal rule with respective settings to redirect, forward, and/or delegate data communications.

The user interface 500 can include permissions related to a calendar, a call, a task, an inbox, a contact, a note, and/or a journal. A user can set the following options from the user interface 500: receive and make calls on behalf of owner (e.g., user/machine to which a data communication is targeted); or receive calls only. In an advanced portion of the user interface 500, a user can set the following: contact (e.g., ring, initiate, transmit, etc.) the delegate the same time as owner; contact the delegate first, then the owner; or contact owner first then the delegate. In addition, the user interface 500 can enable an option related to monitoring of the delegate when a data communication is handled by the delegate on behalf of the owner. It is to be appreciated that the setting of such rules in an application related to a data communication mode can allow such rules to be translated to various other data communication modes. Thus, setting a rule in an email application can allow such rule to be perpetuated into a voice data communication (e.g., the email application and/or email server can communicate the rule to a voice data communication application, which sets such rule to the voice data communication server). The user interface 500 can include the calendar permission which can enable an editor to read, create, and/or modify an item. Moreover, an option to allow the delegate to receive a copy of meeting-related messages sent can be employed. The user interface 500 can allow a message to be automatically sent to a delegate summarizing the permissions as well as allowing the delegate to see private items.

Figure 6:
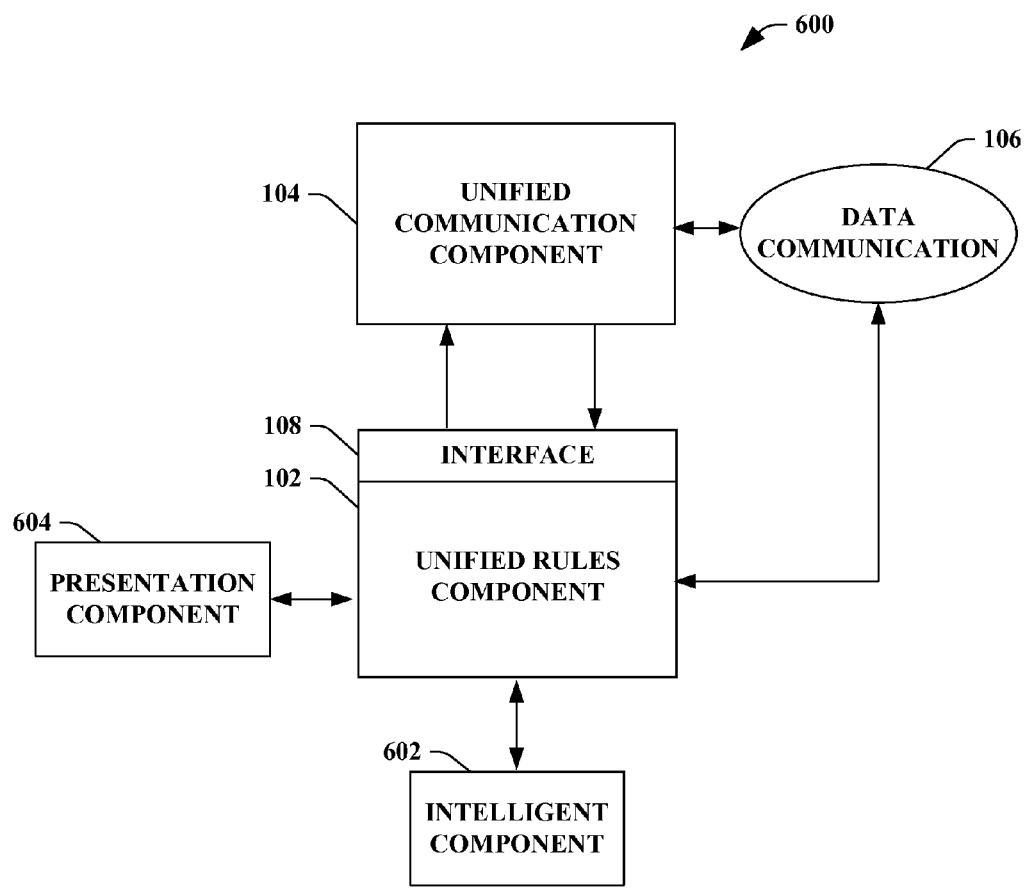
FIG. 6 illustrates a block diagram of an exemplary system that facilitates managing delegates within unified communications utilizing unified rules for email, voice, and/or voicemail.

FIG. 6 illustrates a system 600 that employs intelligence to facilitate managing delegates within unified communications utilizing unified rules for email, voice, fax, and/or voicemail. The system 600 can include the unified rules component 102, the unified communication component 104, the data communication 106, and the interface 108. It is to be appreciated that the unified rules component 102, the unified communication component 104, the data communication 106, and the interface 108 can be substantially similar to respective components, communications, and interfaces described in previous figures. The system 600 further includes an intelligent component 602. The intelligent component 602 can be utilized by unified rules component 102 to facilitate seamlessly applying a universal rule for data communication delegation, forwarding, and/or redirection within unified communications. For example, the intelligent component 602 can infer universal rules, universal rule settings, user preferences, delegate assignment based on historic data, user preferences based on historic data, data communication mode applicability for universal rules, blocking data communications, identifying spam/junk data communications, unblocking data communications, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The unified rules component 102 can further utilize a presentation component 604 that provides various types of user interfaces to facilitate interaction between a user and any component coupled to the unified rules component 102. As depicted, the presentation component 604 is a separate entity that can be utilized with the unified rules component 102. However, it is to be appreciated that the presentation component 604 and/or similar view components can be incorporated into the unified rules component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the unified rules component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
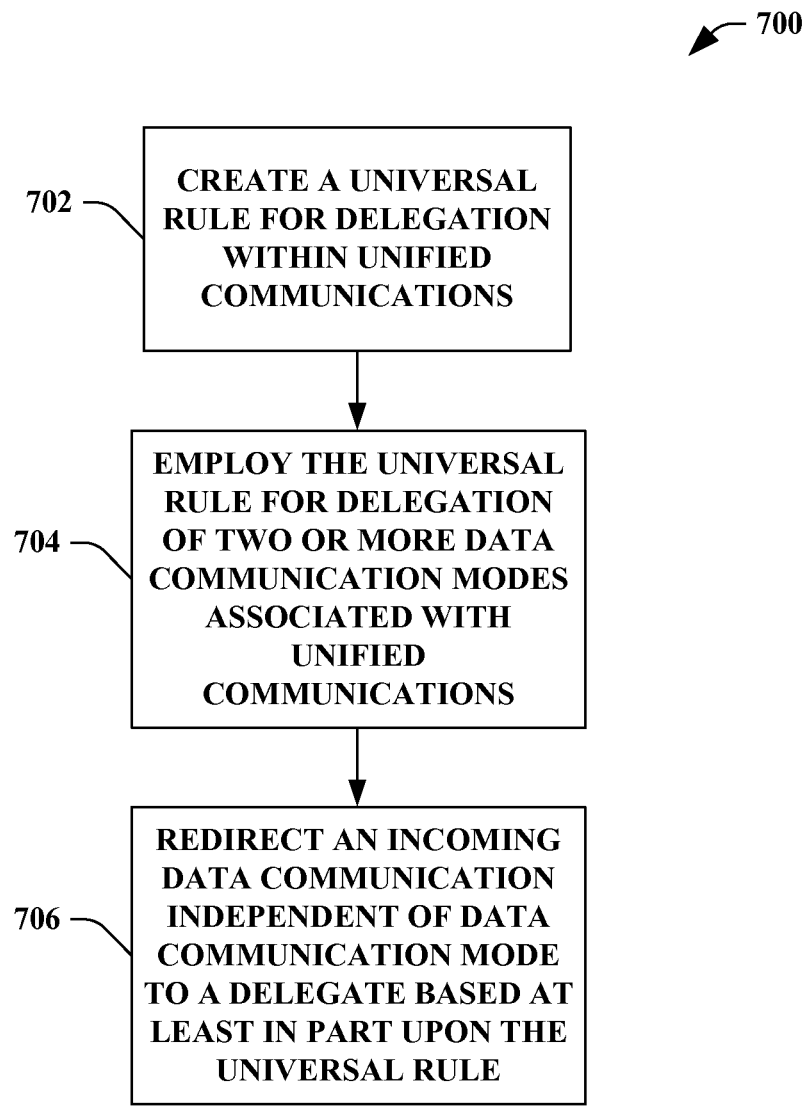
FIG. 7 illustrates an exemplary methodology for redirecting data communications with unified rules within unified communications.
Figure 8:
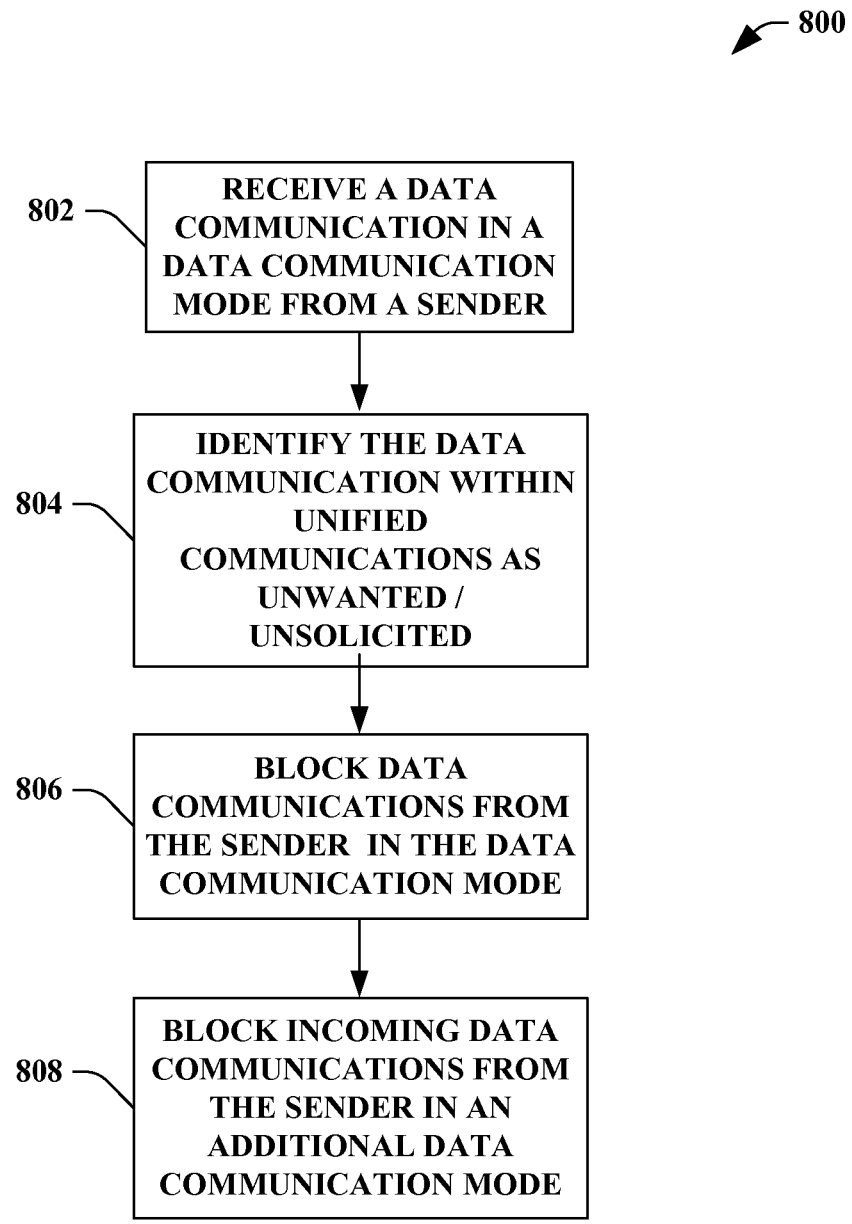
FIG. 8 illustrates an exemplary methodology that facilitates identifying unwanted data communications across a plurality of data communication modes within unified communications.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates redirecting data communications with unified rules within unified communications. At reference numeral 702, a universal rule can be created for delegation within unified communications. For instance, a data communication from a source to a target can be delegated by the target to an entity, wherein the entity can receive the data communication based at least in part upon the delegation. In other words, a delegation of a data communication with unified communications allows a disparate entity (e.g., user, machine, company, business, enterprise, etc.) other than the intended target to receive and/or handle such data communications. For example, a boss can delegate an assistant to handle and/or receive data communications. It is to be appreciated that the data communication can be in any suitable data communication mode such as, but not limited to, audio, fax, email, video, voice, voicemail, instant messaging, etc.

At reference numeral 704, the universal rule can be employed for delegation of two or more data communication modes associated with unified communications. Thus, the universal rule can provide delegation, forwarding, and/or redirection of a data communication, wherein the universal rule can be applied across various data communication modes within unified communications. For instance, a universal rule for email delegation (e.g., assigning a delegate to receive emails on behalf of an entity) can be utilized to enable delegation for voice data communications (e.g., assigning the delegate to receive voice calls on behalf of the entity). It is to be appreciated that the universal rule can be created and/or generated for one data communication mode within unified communications and be applied across any data communication mode utilized within unified communications. Thus, a user can create a universal rule to delegate for voice and such universal rule can be applied and/or utilized for email, audio, fax, voicemail, instant messaging, video, etc.

At reference numeral 706, an incoming data communication can be redirected independent of data communication mode to a delegate based at least in part upon the universal rule created. In other words, an incoming data communication can be forwarded and/or redirected to the delegate assigned in the universal rule regardless of the format and/or mode of the incoming data communication. For instance, a secretary can create a universal rule for email in which a receptionist can be the assigned delegate to handle/receive incoming email. This universal rule can be applied to various data communication modes/formats (e.g., in addition to email, voice, audio, voicemail, fax, instant messaging, video, etc.) within unified communications, in which incoming data communications directed toward the secretary can be redirected to the receptionist.

FIG. 8 illustrates a method 800 for identifying unwanted data communications across a plurality of data communication modes within unified communications. At reference numeral 802, a data communication in a data communication mode can be received from a sender. It is to be appreciated that the data communication can be related to unified communications, wherein the data communication can be in at least one of the following data communication modes: email; voice; fax, voicemail; audio; video; or instant messaging. At reference numeral 804, the data communication can be identified within unified communications as unwanted and/or unsolicited (e.g., spam, junk mail, etc.). For instance, the identification can be at least one of user-defined, manual, automatic, filter identified, server identified, and/or any combination thereof.

At reference numeral 806, data communications can be blocked from the sender in the data communication mode. In other words, since the data communication from the sender was identified as unwanted, unsolicited, spam, junk, etc., future data communications from the sender in that particular data communication mode can be blocked accordingly. At reference numeral 808, incoming data communications from the sender can be blocked in an additional data communication mode. For instance, an incoming email data communication mode can be identified as spam, wherein emails from such sender can be blocked. In addition, additional data communication modes from the sender can be blocked such as, but not limited to, any data communication mode associated with unified communications, voice, voicemail, audio, instant messaging, video, etc. It is to be further appreciated and understood that the methodology 800 can be utilized to unblock an incoming data communication based at least in part upon the identification of a data communication as wanted, not junk, not spam, etc.

Figure 9:
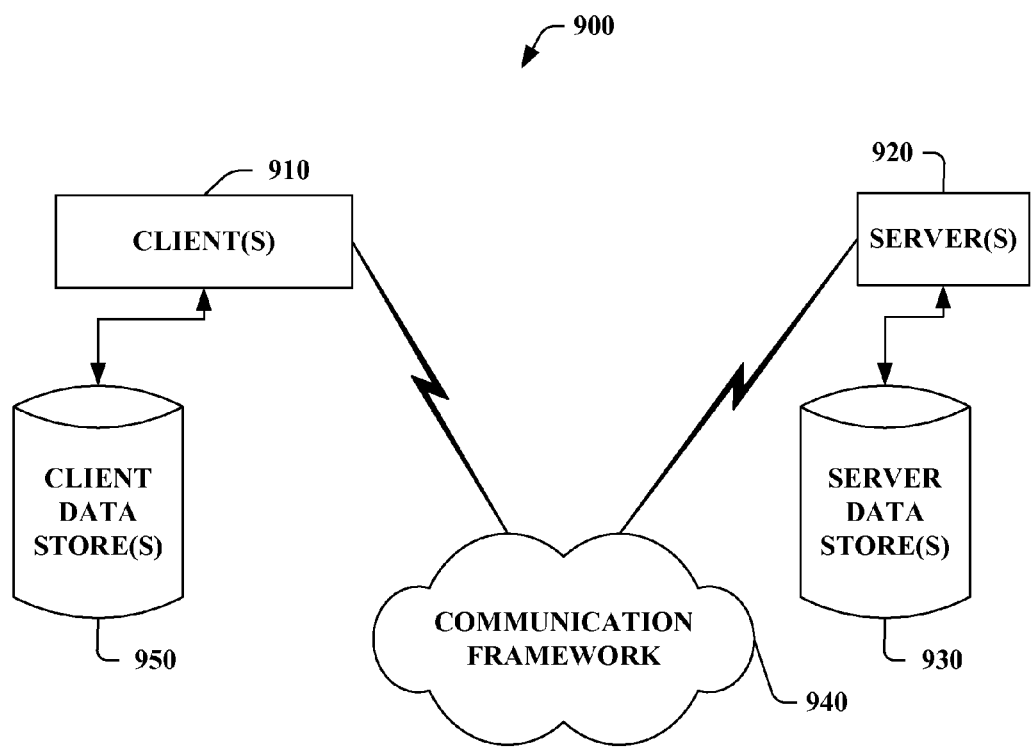
FIG. 9 illustrates an exemplary networking environment, wherein the novel aspects of the claimed subject matter can be employed.
Figure 10:
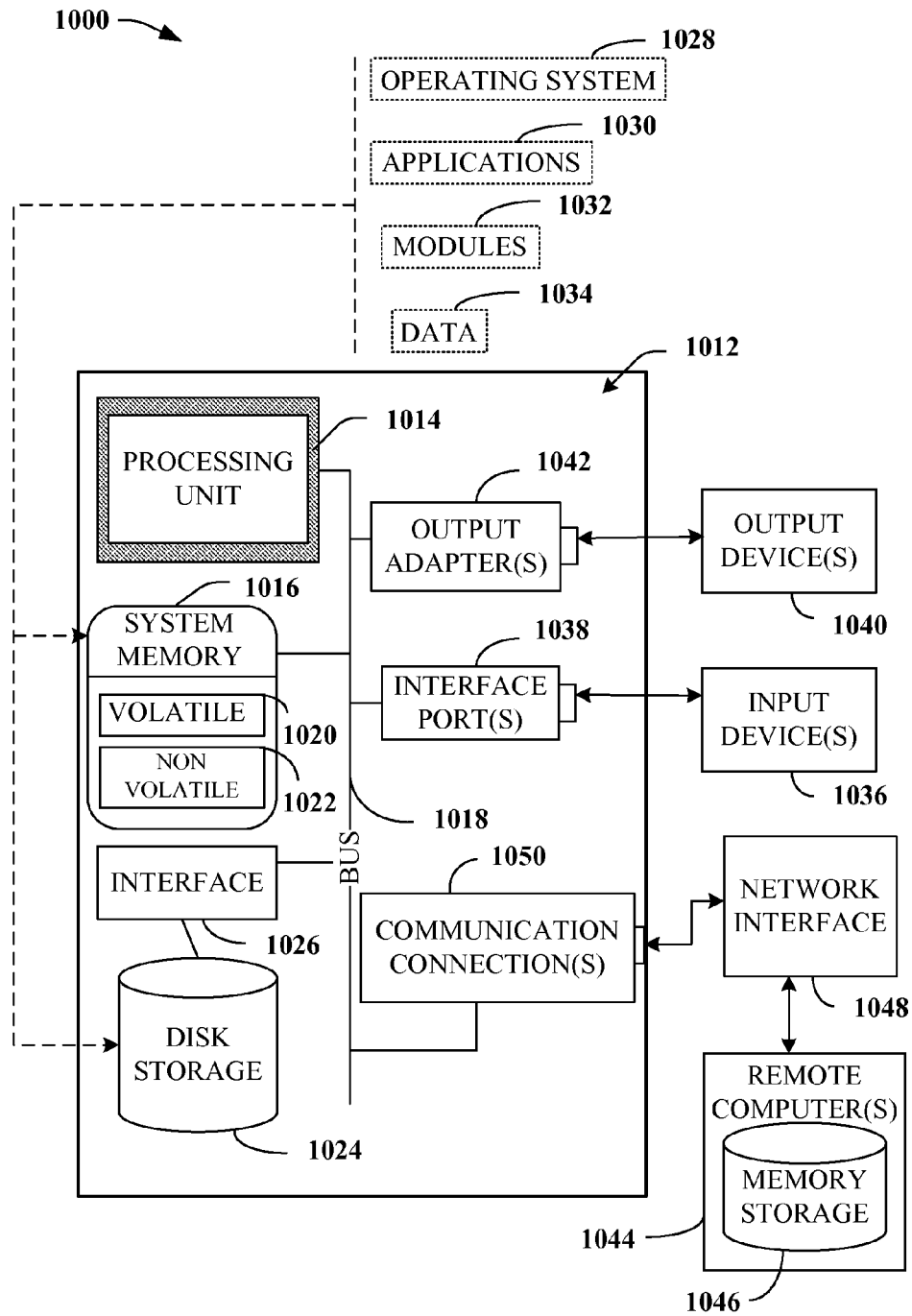
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a unified rules component can redirect a data communication based upon a universal rule that is applicable to a plurality of data communication modes within unified communications, as described in previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising one or more processors and one or more computer-readable storage media, the one or more computer-readable storage media storing instructions executable by the one or more processors to implement:

a unified communications component configured to handle a plurality of disparate data communication modes;

a blocking component configured to, based on a universal rule and an identification of an unwanted data communication from a source in a first data communication mode of at least a subset of the plurality of disparate data communication modes, block a subsequent data communication from the source in a second data communication mode, different from the first, of the at least a subset of the plurality of disparate data communication modes; and a unified rules component configured to apply the universal rule to a data communication received in any of the at least a subset of the plurality of disparate data communication modes, the unified rules component further configured to automatically redirect the data communication to a delegate via application of the universal rule independent of a particular one of the plurality of disparate data communication modes in which the data communication was received.

2. The system of claim 1, further comprising a settings component configured to enable defining of the at least a subset of the plurality of disparate data communication modes in which to apply the universal rule.

3. The system of claim 1, the settings component being further configured to assign a machine as the delegate to at least one of redirect, transfer or forward the data communication.

4. The system of claim 3, further comprising an interface component configured to enable setting of a plurality of options with respect to delegate permissions, the setting of the plurality of options being configured for translation to each of the at least a subset of the plurality of disparate data communication modes.

5. The system of claim 1, further comprising a blocking component configured to identify the data communication as unwanted and, based on the universal rule, block the data communication if received in any of the at least a subset of the plurality of disparate data communication modes.

6. The system of claim 1, the first data communication mode including email or instant messaging and the second data communication mode including voice or voicemail.

7. The system of claim 1, the first data communication mode including voice or voicemail and the second data communication mode including email or instant messaging.

8. The system of claim 1, further comprising a settings component configured to enable definition of the first data communication mode and the second data communication mode.

9. A method comprising using one or more computing devices to execute instructions stored one or more computer-readable storage media to implement operations including:

receiving a first data communication in a first communication mode;

redirecting the first data communication to a first delegate based on a rule independent of a first data communication format in which the first data communication was received;

blocking a second data communication in a second communication mode different from the first communication mode, the blocking based on the rule and an identification of the first data communication as an unwanted data communication; and redirecting the second data communication to a second delegate based on the rule independent of a second data communication format in which the second data communication was sent.

10. The method of claim 9, further comprising:
receiving a third data communication in the first communication mode from a source;
determining, based on a setting, that the third data communication is unwanted; and
based on the determining, blocking a fourth data communication in the second communication mode from the source.

11. The method of claim 9, the redirecting of the second data communication comprising communicating the rule to an application corresponding to the second communication mode.

12. The method of claim 11, further comprising, by the application, setting the rule in a server corresponding to the second communication mode.

13. The method of claim 9, comprising receiving the first data communication as email or instant messaging and receiving the second data communication as voice or voicemail.

14. The method of claim 9, comprising receiving the first data communication as voice or voicemail and receiving the second data communication as email or instant messaging.

15. A computer-readable storage medium storing instructions executable by a computing device, the instructions configured to, in response to execution by the computing device, cause operations including:
receiving a data communication in one of multiple communication modes;
based on a rule applying to all of the multiple data communication modes, automatically redirecting the data communication to a delegate independent of a particular one of the multiple data communication modes in which the data communication was received; and
blocking a subsequent data communication based on the rule and an identification of an initial data communication as unwanted, the subsequent data communication sent in a communication mode disparate from a communication mode of the initial communication.

16. The computer-readable storage medium of claim 15, the operations further including:
based on the rule, assigning the data communication to a delegate.

17. The computer-readable storage medium of claim 15, the operations further including:
identifying an initial data communication received from a sender as unwanted; and
blocking a subsequent data communication from the sender sent in a communication mode disparate from a communication mode of the initial communication.

18. The computer-readable storage medium of claim 15, further comprising identifying the initial data communication as unwanted by identifying the initial data communication as comprising a spam or junk email.

19. The computer-readable storage medium of claim 18, the blocking the subsequent data communication including blocking a data communication sent in at least one of a voice data communication mode, an audio data communication mode, an instant messaging data communication mode, a video data communication mode, or a voicemail data communication mode.

* * * * *